Patented Jan. 1, 1935

1,986,423

BEST AVAILABLE COPY

UNITED STATES PATENT OFFICE 1,986,423

PROCESS FOR THE PRODUCTION OF DIPHENYLMETHANES

James A. Arvin, Wilmington, Del., assignor to E. I. du Pont de Nemours & Company, Wilmington, Del., a corporation of Delaware No Drawing. Application January 19, 1933, Serial No. 652,565

16 Claims. (Cl. 260—64)

This invention relates to the production of certain polynuclear phenols and it relates in particular to a process of manufacturing condensation products of phenols and aldehydes or ketones in the presence of a condensing agent containing sulfuric acid and boric acid.

It has long been known that aldehydes of two or more carbon atoms or ketones, especially acetone, combine readily with phenol or its analogs such as the cresols to form polynuclear phenols of the type $HO-C_6H_4-R-C_6H_4-OH$ where R is the aldehyde or ketone residue. These compounds in the pure state are stable crystalline products of definite melting points.

It is also known generally that sulfuric acid can be employed as a condensing agent in the formation of these compounds, but haphazard methods result in a low yield and products of poor quality. They are dark in color, of melting point considerably below that of the purified compound, and are contaminated with appreciable quantities of unreacted phenol, resinous and other by-products, as well as sulfonic acids if sulfuric acid was employed as the condensing agent.

It has now been discovered that a higher yield and a product of improved quality can be obtained by employing a small percentage of boric acid in addition to sulfuric acid for the condensation of phenol and acetone. It has also been discovered that this improvement is realized in the synthesis of related compounds from substituted phenols such as o-cresol, m-cresol, and o-butyl phenol and homologs of acetone such as methyl ethyl ketone and dipropyl ketone or aldehydes such as acetaldehyde, benzaldehyde, and butyraldehyde. Certain other refinements in the method of carrying out the process and in purifying the product have also been made.

This invention therefore has as an object improvements in the manufacture of certain polyhydric phenols, especially those synthesized from phenol or its homologs and acetone or acetaldehyde or their homologs. A particular object is improvement in the manufacture of di(4-hydoxyphenyl) dimethylmethane by the sulfuric acid process whereby the quality and amount of the product may be enhanced. These and other objects appearing hereinafter have been accomplished by including a small proportion of boric acid in with the reaction mixture.

The following example illustrates but does not limit the invention:

Example

| Ingredient | Parts by weight | Mols | Molar ratio |
|---|---|---|---|
| Phenol (USPX) | 564 | 6 | 1.0 |
| Acetone (redistilled) | 174 | 3 | 0.5 |
| $H_2SO_4$ (67.5%) | 3776 | 26 | 4.33 |
| Boric acid | 9.8 | 1.75%, based on the phenol | |

The phenol is melted, the acetone added, and the mixture cooled to 25° C. The boric acid is dissolved in the sulfuric acid and this mixture added to the phenol-acetone mixture. The composite mixture is stirred at 30°–35° C. for 15 hours in a closed vessel under a reflux condenser, the temperature then being raised to 50° C. and maintained at this point for 12 hours. The product is filtered and washed once with a small volume of water. The sulfuric acid liquor can be bolstered to the proper strength with 20% oleum and re-used in the process. The orange-colored crystals are suspended in water and neutralized with 10% NaOH until basic to litmus. The light-gray solid is washed with water to remove sodium sulfate and the major portion of the unchanged phenol. The final traces of phenol are then removed by steam distillation, hydrochloric acid being added until the contents of the steam distillation vessel are acid to Congo red. When the distillate no longer gives a violet coloration with ferric chloride, the steam distillation is complete. The molten product is then cooled to room temperature with rapid stirring. A granular almost white solid is obtained which is filtered, washed twice with water and dried. A yield of 540 parts of di(4-hydroxyphenyl) dimethylmethane, or about 80% of the theoretical, is obtained. This product melts at 155°–156° C. Under the same conditions without boric acid a 70% yield of a grayish or cream-colored solid melting at 150° C. is obtained.

While the applicant does not wish to be limited to theory, it is believed that the increased yield is due to the anti-sulfonating effect of the boric acid, the loss of phenol through the formation of sulfonic acid being thus avoided and a greater amount of phenol being made available for forming the desired product. It is also believed that the higher quality of the product, i. e., better color and melting point, is due to the absence of greatly decreased quantity of sulfonic acids which darken on exposure to the air and when mixed with the desired product, depress its melting point.

Best results are obtained in preparing di(4-hydroxyphenyl)dimethylmethane by using theoretical proportions of phenol and acetone, 4 to 5 mols of sulfuric acid per mol of phenol, a concentration of sulfuric acid of 65%–70%, and by keeping the temperature in the early stages of the reaction in the range of 25°–35° C. and in the latter stages in the range of 45°–55° C. About 0.5%–5.0% boric acid, based on the weight of the phenol, is sufficient to produce the stated results, although quantities outside this range are not precluded. Efficient stirring throughout the reaction is highly important.

While the above conditions represent the preferred embodiment of the invention, it is not limited thereto. This is shown by carrying out two preparations of di(4-hydroxphenyl)dimethylmethane under exactly the same extraneous conditions, boric acid being present in one of the two preparations. For example, if the compound in question is prepared using sulfuric acid, with and without boric acid, the following results are obtained:

|  | A. With boric acid | B. Without boric acid |
|---|---|---|
| Yield | 70.5% | 65%. |
| Color | Gray to cream | Orange to red. |
| M.P. | 138°–148° C | 135°–143° C. |

In the above comparative experiments, theoretical proportions of phenol and acetone were heated in the presence of 4.4 mols H₂SO₄ (diluted to 70%) per mol of phenol for six hours at 45°–50° C., then at 55°–60° C. for a further 12 hours, and the products washed and dried. 2.3% boric acid, based on the phenol, was used in Case A.

While the preferred conditions are given in the second paragraph above, the reaction temperature may range up to 65° C., the molar ratio of phenol to acetone may vary somewhat above and below the theoretical, the molar ratio of sulfuric acid to phenol may vary from about 2:1 to 6:1, and the concentration of acid may vary from 65% to 75% by weight.

The control of the acidity in the purification steps, as indicated in the example, is important. The neutralization with alkali should be carried to a pH of at least 7 (litmus or bromthymol blue are suitable indicators) in order to render more water-soluble unreacted phenol and traces of sulfonic acids which may be present in spite of the boric acid. In the steam distillation step, the pH should be definitely on the acid side (as acid to Congo red) in order to make the remaining unchanged phenol completely volatile with steam.

This invention is applicable in principle to analogous syntheses in which sulfuric acid is employed as a condensing agent. o-cresol, m-cresol, o-butyl phenol, β-naphthol, or o-chlorophenol may replace the phenol, and acetaldehyde, methylethylketone, n-butyraldehyde, dipropylketone, cyclohexanone, or benzaldehyde may replace the acetone. In such cases a higher yield and a better quality product is obtained if boric acid is present.

A hydrochloric acid-boric acid condensing medium may be used in place of the sulfuric acid-boric acid medium already described.

It is known that phenol or its analogs such as o-cresol combine with fuming sulfuric acid to form compounds of the type

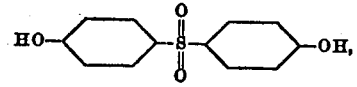

which carry ring substituents when prepared from phenol analogs. Boric acid also increases the yield and enhances the quality of the products in such syntheses. This is likewise probably due to its anti-sulfonating effect.

Boron or other compounds of boron, while their action is more erratic, produce the effects claimed herein to a greater or less degree. Among these are borax, sodium meta-borate and perborate, boron oxide, etc. The effect of the boron compound appears to depend upon its solubility in sulfuric acid.

High quality phenols prepared in accordance with the present invention are suitable for many uses and are usually more suitable than the crude products employed heretofore. Among these uses are resin syntheses, as with formaldehyde, dichlorodiethyl ether, and phthalyl chloride; antioxidants and polymerization inhibitors, as for gasoline, paints, varnishes, etc.; insecticides (either as the phenol or a salt thereof); and as a dye intermediate. They can be nitrated to form explosives, or sulfonated to form wetting, dispersing or emulsifying agents.

The above description and specific examples are illustrative only. Any variation therefrom which conforms to the spirit of the invention is intended to be included within the scope of the claims.

I claim:

1. In the process of condensing a phenol and a member of the class consisting of aldehydes of at least two carbon atoms, and ketones in the presence of an acid condensing medium, the step which comprises including an acid-soluble boron compound in the reaction mixture.

2. The process of claim 1 in which the acid condensing medium is sulfuric acid.

3. The process of claim 1 in which the acid condensing medium is sulfuric acid and the boron compound is a member of the class consisting of boric acid, borax, sodium metaborate, sodium perborate, and boron oxide.

4. In the process of condensing a phenol and a ketone in the presence of an acid condensing medium, the step which comprises including an acid-soluble boron compound in the reaction mixture.

5. In the process of condensing a phenol and a ketone in the presence of sulfuric acid, the step which comprises including an acid-soluble boron compound in the reaction mixture.

6. The process of forming condensation products which comprises heating a mixture comprising a phenol, a member of the class consisting of aldehydes of at least two carbon atoms and ketones, sulfuric acid and a small amount of boric acid.

7. The process of forming condensation products which comprises heating a mixture comprising a phenol, a ketone, an acid condensing medium and a small amount of boric acid.

8. The process of forming condensation products which comprises heating a mixture comprising a phenol, acetone, an acid condensing medium and an acid-soluble boron compound.

9. The process of forming condensation products which comprises heating a mixture comprising a phenol, acetone, sulfuric acid and boric acid.

10. The process of forming condensation products which comprises heating a mixture comprising phenol, acetone, sulfuric acid and boric acid.

11. The process of forming condensation products which comprises heating about two mols of a phenol with about one mol of a member of the class consisting of aldehydes of at least two carbon atoms and ketones, at a temperature of 25°–65° C. for several hours, in the presence of aqueous sulfuric acid of a concentration by weight of 65%–75% and in the presence of an amount of boric acid of 0.5%–5.0% by weight of the phenol, the sulfuric acid being present in a molar amount of 2–6 mols per mol of phenol.

12. The process of claim 11, in which the reacting compounds are phenol and acetone.

13. The process of claim 11, in which the reaction mixture is subjected at first to a lower reaction temperature for several hours, the temperature then being raised until the reaction is complete.

14. The process of claim 11, further characterized in that the reaction product is subjected to a purification step to remove sulfuric acid and unreacted phenol.

15. The process of claim 11, further characterized in that the reaction product is washed with water, neutralized, again washed with water, and is steam distilled to remove traces of unreacted phenol.

16. The process of forming di(4-hydroxyphenyl)dimethylmethane, which comprises adding one-half mol of acetone to one mol of molten phenol, cooling to 25° C., adding to the mixture 4.33 mols of aqueous sulfuric acid of 67.5% strength and containing dissolved therein boric acid of a weight 1.75% that of the phenol, stirring the mass at 30°–35° C. for 15 hours under reflux, raising the temperature to 50° C. and maintaining it at that point for 12 hours, then filtering and washing the precipitate with a small volume of water, suspending in water and neutralizing with 10% caustic soda until basic to litmus, washing again with water, steam distilling to remove the final traces of phenol, while adding hydrochloric acid until the contents of the vessel are acid to Congo red, then when the phenol is completely removed, cooling the distilled mass.

JAMES A. ARVIN.